(12) United States Patent
Banyasad et al.

(10) Patent No.: US 8,332,750 B2
(45) Date of Patent: Dec. 11, 2012

(54) RESOLVING INTER-PAGE NODES AND CONNECTORS IN PROCESS DIAGRAMS

(75) Inventors: Omid Banyasad, Kanata (CA); Mark Andrew MacDonald, Kanata (CA); Siobhan Nearey, Ottawa (CA); Rodrigo Trevizan Peretti, Kanata (CA); David Douglas Springgay, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 12/566,851

(22) Filed: Sep. 25, 2009

(65) Prior Publication Data
US 2010/0318942 A1 Dec. 16, 2010

(51) Int. Cl.
*G06F 17/27* (2006.01)
(52) U.S. Cl. ......... 715/251; 715/200; 715/243; 715/274
(58) Field of Classification Search .................. 715/200, 715/243, 251, 274
See application file for complete search history.

(56) References Cited

U.S. PATENT DOCUMENTS

| | | | |
|---|---|---|---|
| 5,522,022 A * | 5/1996 | Rao et al. | 345/440 |
| 6,337,748 B1 * | 1/2002 | Murata et al. | 358/1.4 |
| 6,591,076 B2 * | 7/2003 | Connors | 399/194 |
| 7,660,869 B1 * | 2/2010 | Kitts | 709/217 |
| 2005/0094846 A1 * | 5/2005 | Watanabe | 382/100 |
| 2006/0150093 A1 * | 7/2006 | Chen | 715/518 |
| 2008/0043259 A1 * | 2/2008 | Triplett et al. | 358/1.9 |
| 2009/0080641 A1 * | 3/2009 | Fitzgerald | 379/265.11 |
| 2009/0199088 A1 * | 8/2009 | Haug et al. | 715/244 |

* cited by examiner

*Primary Examiner* — Doug Hutton, Jr.
*Assistant Examiner* — Andrew Dyer
(74) *Attorney, Agent, or Firm* — Jeanine S. Ray-Yarletts

(57) ABSTRACT

A computer implemented method, apparatus, and computer program product for resolving inter-page nodes in flow diagrams is presented. In one embodiment, an inter-page node in a flow diagram is identified. An inter-page node is a node laid out on a page break in a multi-page flow diagram. A set of candidate pages is formed. A bid for each page in a set of candidate pages is requested from each policy in a set of page break policies. A page is selected from the set of candidate pages based on bids received from the set of page break policies. A value of each bid indicates a level of suitability of each page in the set of candidate pages. The inter-page node located on the page break is moved to a new location on the selected page. The new location on the selected page is located off of all page breaks for the flow diagram.

16 Claims, 10 Drawing Sheets

RESOLVING INTER-PAGE NODES AND CONNECTORS IN PROCESS DIAGRAMS

RELATED APPLICATIONS

This application claims priority to and claims the benefit of Canadian Patent Application Serial Number 2,668,807 entitled "Resolving Inter-Page Nodes and Connectors in Process Diagrams" which was filed with the Canadian Patent Office on Jun. 12, 2009, and which is incorporated herein by reference in its entirety.

BACKGROUND OF THE INVENTION

1. Field of the Invention

The present invention relates generally to an improved data processing system and in particular to a method and apparatus for generating flow diagrams. More particularly, the present invention is directed to a computer implemented method, apparatus, and computer usable program code for a multi-policy framework for resolving inter-page nodes and generating navigational aids for paginated flow diagrams.

2. Description of the Related Art

When a user creates a process flow diagram, the user may print the flow diagram to share it or present to others. The flow diagram may be so large that the entire document cannot be printed out on a single page. In such cases, the user may print a multi-page process flow diagram in a paginated format. However, flow diagrams frequently branch out both horizontally and vertically. In other words, when a flow diagram is printed out in a paginated format, the flow diagram may span several pieces of paper in both horizontal and vertical directions.

The current method for printing multi-page process flow diagrams is simply to divide a flow diagram into a grid sequence of printed pages, each of which may contain the current page number and/or the total number of pages of the document in a header or footer. This approach is convenient for printing documents that grow in one dimension while having a fixed size in the opposite dimension. However, when printing two-dimensional flow diagrams that branch out across multiple pages, the printed output may be difficult to follow, read, and understand.

BRIEF SUMMARY OF THE INVENTION

According to one embodiment of the present invention, a computer implemented method, apparatus, and computer program product for resolving inter-page nodes in multi-page flow diagrams is provided. An inter-page node in a flow diagram is identified. A bid for each page in a set of candidate pages is requested from each policy in a set of page break policies. An inter-page node is a node laid out on a page break in a multi-page flow diagram. A page is selected from the set of candidate pages based on bids received from the set of page break policies to form a selected page. A value of each bid indicates a level of suitability of each page in the set of candidate pages. The inter-page node located on the page break is moved to a new location on the selected page. The new location on the selected page is located off of all page breaks for the flow diagram.

In another embodiment, a computer implemented method, apparatus, and computer program product for generating navigational aids for the multi-page flow diagrams is provided. In response to receiving a selection to print a flow diagram in a poster format, poster format navigational aids are generated in a set of margins on each page of the flow diagram. The poster format navigational aids comprise annotations with instructions for recreating the flow diagram as a poster. In response to receiving a selection to print the flow diagram in a report format, each inter-page connection in a set of connections crossing a page break is split to form a split anchor pair associated with the connection. A first split anchor in the split anchor pair is generated on a page where the split connection begins and a second split anchor in the split anchor pair is generated on a page where the split connection ends. Each split anchor pair is annotated with a unique identifier. Report format navigational aids are generated in a set of margins on each page of the flow diagram. In this embodiment, the report format navigational aids comprise arrows and a page number identifying a page on which a next sequential portion of the flow diagram is found.

DETAILED DESCRIPTION OF THE INVENTION

Figure 1:
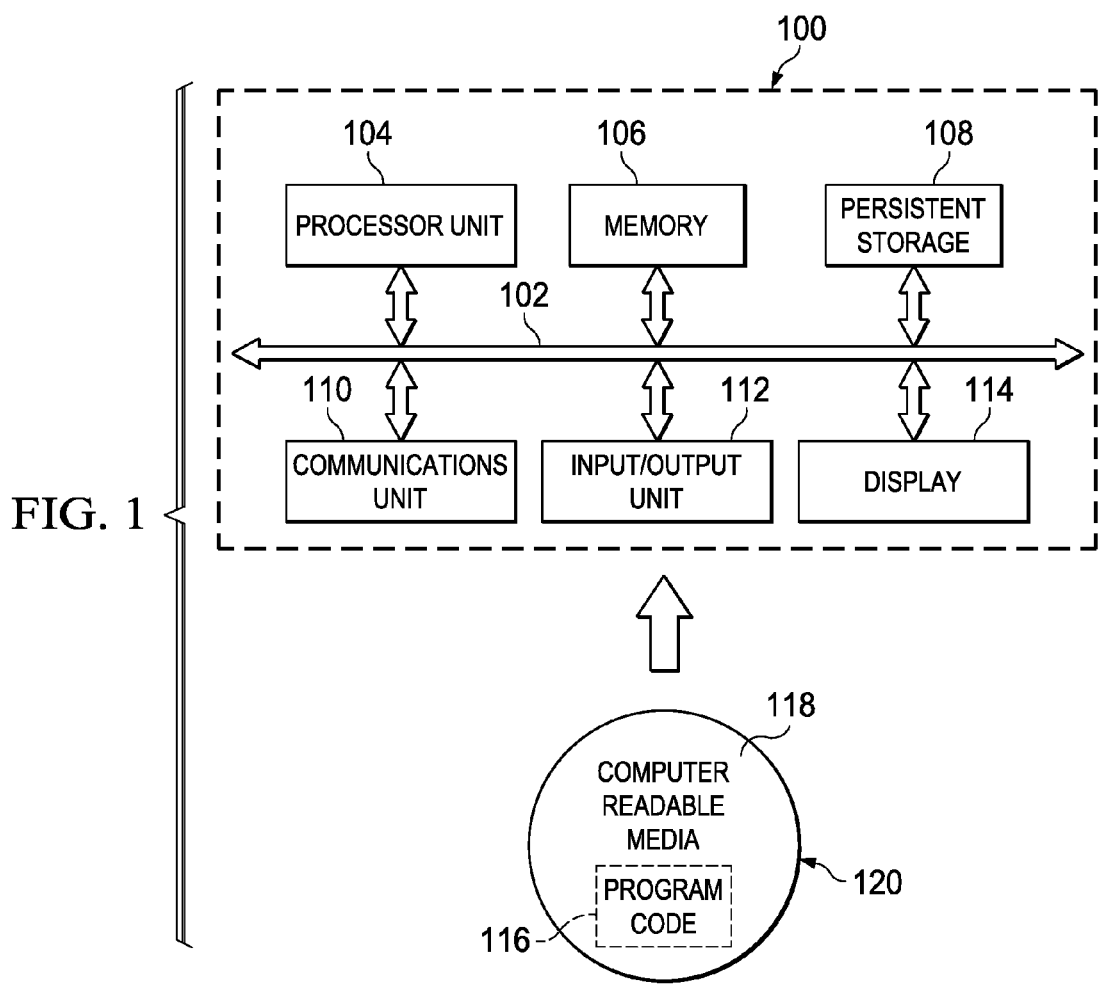
FIG. 1 is a block diagram of a data processing system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the Connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
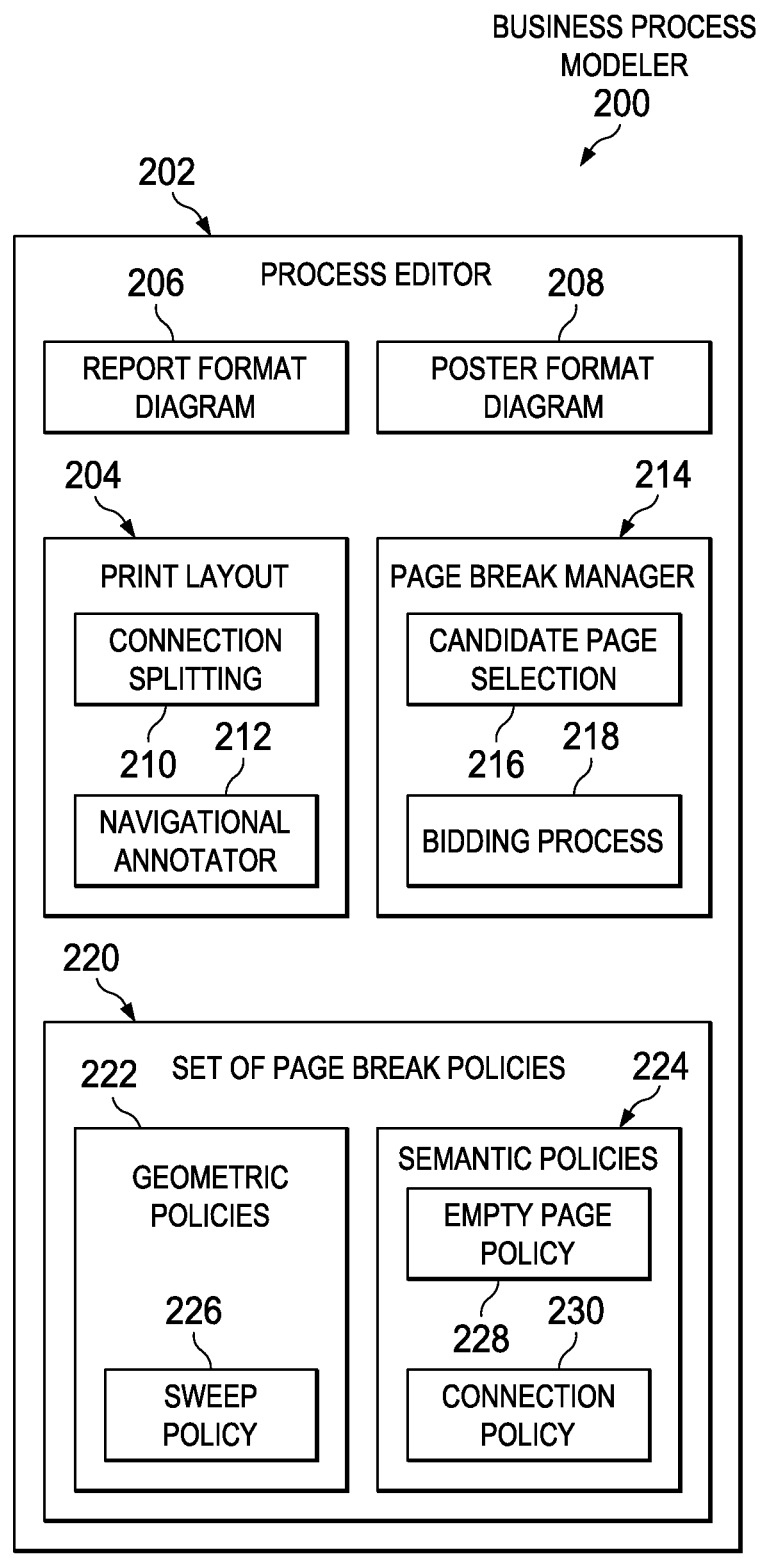
FIG. 2 is a block diagram of a business process modeler for generating process diagrams in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a block diagram of a data processing system is shown in which illustrative embodiments may be implemented. Data processing system 100 is an example of a computer, such as, without limitation, a server, a client, a laptop, a personal digital assistant (PDA), or any other type of computing device in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer recordable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108, and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Process flow diagrams are frequently created by users employing software applications, such as, without limitation, a graphical editor. A process flow diagram, also referred to as a flow diagram, is a diagrammatic representation of the execution and data flow of a process. Process flow diagrams are free to grow infinitely both horizontally and vertically. It is also common for a flow diagram to span multiple pages in both directions when displayed or reproduced on a tangible medium, such as a paper printout.

These process flow diagrams may be printed in a poster format or a report format. A poster is a flow diagram whose pages are intended to be printed and then arranged side-by-side into a grid that forms a complete image of the on-screen diagram. A poster format may be used when a user wants to recreate a process diagram for presentation purposes. A report is a diagram whose pages are intended to be printed and then stacked, clipped together, or bound like a book, and read one page at a time.

The illustrative embodiments recognize that flow diagrams sometimes branch out horizontally and/or vertically across two or more pages. These flow diagrams are typically paginated into a grid to produce printed output in either poster or report format. The resulting printed pages may be difficult to understand due to page breaks dissecting nodes, loops in the process flow, overlapping nodes and connectors, and/or page breaks dissecting connections.

As used herein, the term "connection" refers to a line and/or arrow indicating a direction of flow in the flow diagram. A connection may also be referred to as an "edge". A connection that is laid out across a page break is referred to herein as an inter-page connection. In other words, an inter-page connection is a connection that crosses a page boundary or a connection that is bisected by a page break.

As used herein, a node is any part of a flow diagram other than the connections. A node may include a start symbol, an end symbol, or any type of vertices. Vertices indicate steps where work is done or a decision is made. Vertices may include, without limitation, a condition or decision block, an input block, an output block, or a process block. A node laid out on one or more page breaks is referred to herein as an inter-page node. In other words, an inter-page node is a node that crosses a page boundary or a node that is bisected by a page break. A flow diagram is represented visually where nodes appear as different shapes and connections appear as lines and arrows connecting the nodes.

The embodiments also recognize that printed flow diagrams spanning multiple pages are often difficult to assemble to form a complete poster format image of the entire flow diagram. Furthermore, if the output is read in a page-by-page fashion, such as in a report, the reader may find it difficult to follow the execution, data or control flow across multiple pages due to overlapping nodes, overlapping connectors, loops, and page breaks dissecting nodes and/or connectors. For example, the reader may find it difficult or impossible to read text associated with node(s) that are severed at the edge of a page by a page break.

Therefore, in one embodiment, a computer implemented method, apparatus, and computer program product for resolving inter-page nodes in multi-page flow diagrams is provided. In response to identifying an inter-page node in a flow diagram, the process requests a bid for each page in a set of candidate pages from each policy in a set of page break policies. An inter-page node is a node laid out on a page break. The process selects a page from the set of candidate pages based on bids received from the set of page break policies to form a selected page. A value of each bid indicates a level of suitability of each page in the set of candidate pages. The process moves the node located on the page break to a new location on the selected page. The calculated location on the selected page is located off of all page breaks for the flow diagram. The set of page break policies includes at least one geometric policy. The geometric policy identifies the new location for the inter-page node on the selected page.

As used herein, the term "at least one of", when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. Thus, at least one geometric policy may be a set of one geometric policy, two geometric policies, as well as three or more geometric policies.

The set of page break policies optionally includes a connection policy. The connection policy identifies a connection distance associated with each connection of the inter-page node for each page in the set of candidate pages, by the connection policy. A connection distance indicates a distance between a target page and a source page. In one embodiment, the connection policy identifies a node dispersion value associated with the inter-page node for each page in the set of candidate pages. The node dispersion value is computed from the connection distances for all input and output connections for the inter-page node. The connection policy generates a bid for each page in the set of candidate pages based on the node dispersion value for each page.

In one embodiment, the set of page break policies comprises an empty page policy. If the empty page policy determines that a page contains at least one node, the empty page policy submits a bid indicating a high suitability for the page. If the empty page policy determines that a page is an empty page, the empty page policy submits a bid indicating a low suitability of the page, wherein an empty page is a page that does not contain at least one node.

In yet another embodiment, a computer implemented method, apparatus, and computer program product for generating navigational aids for these multi-page flow diagrams is also provided. In this example, a navigational annotator receives a selection to print a flow diagram in a poster format and generates poster format navigational aids in a set of margins on each page of the flow diagram. The poster format navigational aids optionally include annotations with instructions for recreating the flow diagram as a poster.

In response to receiving a selection to print the flow diagram in a report format, a connection splitting process splits each inter-page connection in a set of connections crossing a page break to form a split connection and a split anchor pair associated with the split connection. A first split anchor in the split anchor pair is generated on a page where the split connection begins and a second split anchor in the split anchor pair is generated on a page where the split connection ends. Each split anchor pair is annotated with a unique identifier. Report format navigational aids are generated in a set of margins on each page of the flow diagram. The report format navigational aids optionally include arrows and a page number identifying a page on which a next sequential portion of the flow diagram is found.

In one embodiment, the connection splitting process hides a data icon and data name associated with the split anchor in response to identifying a split anchor overlapping a given node. Hiding the data icon and data name reduces a size of the split anchor to free additional space. The connection splitting process then moves the split anchor onto the additional space, wherein the split anchor no longer overlaps the given node.

In another embodiment, in response to identifying a split anchor located on a page break, the connection splitting process hides a data icon and data name associated with the split anchor to form additional space off the page break. The connection splitting process moves the split anchor onto the additional space off the page break.

In yet another example, the connection splitting process changes the split anchor to a cut portion split anchor in response to identifying a split anchor located on a page break. The cut portion split anchor covers a smaller amount of space on a page than the split anchor. The cut portion split anchor is not located on the page break.

In response to identifying a split anchor on a given page overlapping a given node, the connection splitting process identifies available space on the given page that is not covered by the given node and moves the split anchor onto the available space so that the split anchor no longer overlaps the given node. The connection splitting process optionally annotates each split anchor in a split anchor pair with a page number identifying a location of the split anchor's counterpart in the split anchor pair.

Although the embodiments described in FIG. 2-18 are described in the context of IBM™ WebSphere Business Modeler, the embodiments are not limited to implementation with IBM™ WebSphere Business Modeler. The illustrative embodiments may be implemented in any process editor or graphing software for creating flow diagrams and/or generating paginated printouts of flow diagrams.

FIG. 2 is a block diagram of a business process modeler for generating process diagrams in accordance with an illustrative embodiment. Business Process Modeler 200 is an application for modeling business processes. Business process modeler 200 may be implemented using any type of business process modeling application, such as, without limitation, IBM™ WebSphere Business Modeler (WBM). Process editor 202 is a graphical editor software tool for creating process flow diagrams.

Print layout 204 is a software component that lays out a flow diagram for printout as report format diagram 206 or poster format diagram 208. In this embodiment, report format diagram 206 comprises navigational aids on each page of a multi-page flow diagram printout that assists the reader in understanding the execution, input/output, and data flow of steps in the flow diagram. Poster format diagram 208 comprises navigational aids on each page of a multi-page flow diagram printout that assists the reader in assembling the pages of the printout to form a complete image of the flow diagram, such as, for example, for use in a presentation or viewing the flow diagram in its entirety rather than in a piecemeal fashion.

Figure 6:
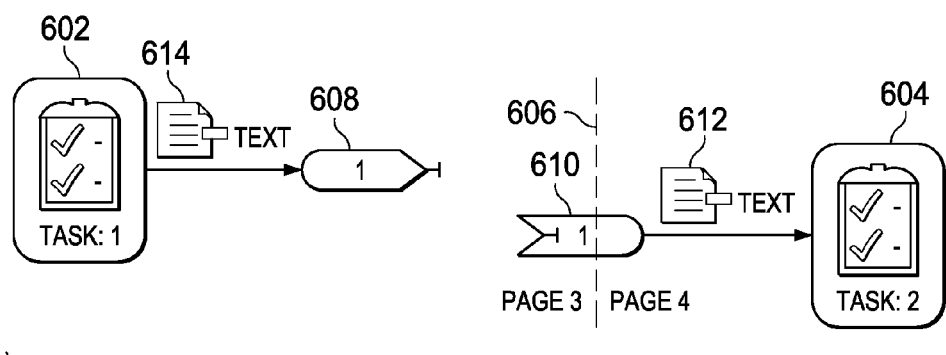
FIG. 6 is a block diagram of a split anchor pair in accordance with an illustrative embodiment.

Connection splitting 210 is a software component that manages connections that cross one or more page boundaries. Connection splitting 210 automatically locates connections that cross page boundaries. In other words, connection splitting 210 locates connections that start on one page and end on another page when the flow diagram is printed out in a multi-page printout. When connection splitting 210 locates a connection that crosses a page boundary, it generates a split anchor pair for the connection. One split anchor in the split anchor pair is placed on the page where the connection begins and the second split anchor in the split anchor pair is placed on the page where the connection terminates at a node. A unique identifier is assigned to the split anchor pair to identify the split anchors in the pair, as shown in FIG. 6 below. In this manner, connection splitting 210 avoids instances of connections that cross page breaks in multi-page flow diagram printouts.

Navigational annotator 212 is a software component that generates custom navigational aids in one or more margins of each page of a multi-page printed flow diagram. In this embodiment, the navigational aids are annotations on the printed page that assist the reader in assembling or navigating the flow diagram. Navigational aids are added to one or more margins of each page of the flow diagram. Navigational annotator 212 adds different types of navigational aids to printed pages depending upon whether the user has selected to print the flow diagram in a poster format or a report format.

In the case of poster format, the navigational aids assist in constructing a complete image of the diagram from the output printed pages of the flow diagram. In the case of report format flow diagrams, navigational annotator 212 generates annotations on each page of the printed output that helps the reader follow the execution and data flow of the flow diagram from page to page.

In this example, page break manager 214 is a multi-policy framework for moving nodes off page breaks in paginated printouts of flow diagrams. A node that is bisected by one or more page breaks is referred to herein as an inter-page node. Page break manager 214 utilizes a set of page break policies (described below) to move all inter-page nodes in the flow diagram off the page breaks. If there is not enough space available on a given page to move a given inter-page node off a page break, the policy utilized by the page break manager 214 rearranges the positions of one or more other nodes on the given page to make enough space available to move the given inter-page node off the page break(s). In other words, one or more policies in set of page break policies 220 determines a new position for one or more nodes on a given page to free up sufficient space to move the inter-page node off page breaks.

Candidate page selection 216 is a software component that identifies a set of candidate pages. A candidate page is a page onto which an inter-page node may be moved off a given page break. A set of candidate pages for a given inter-page node laid out on a page break can include two pages or four pages. An inter-page node that crosses only one page break, such as a node that crosses only a horizontal page break or a node that crosses only a vertical page break, will have only two candidate pages. An inter-page node that is laid out across both a vertical page break and a horizontal page break has four candidate pages. For each node on a page break, candidate page selection 216 utilizes bidding process 218 to select the best candidate page from the set of candidate pages onto which to move the given node.

Page break manager 214 implements bidding process 218 for each inter-page node. When a given node on a page break is identified, candidate page selection 216 identifies a set of candidate pages onto which the given inter-page node can be moved. Bidding process 218 then requests a bid for each candidate page from each policy in set of page break policies 220.

Set of page break policies 220 is a set of page break policies regulating various aspects of diagram visualization. A page break policy is an algorithm that computes a list of bids for each candidate page into which a given inter-page node can be moved. In this embodiment, set of page break policies 220 includes without limitation, geometric policies 222 and semantic policies 224. However, set of page break policies 220 in another embodiment may include only geometric policies 222 without any semantic policies, and/or include one or more other policies not shown in FIG. 2. In this embodiment, set of page break policies includes at least one geometric policy.

Geometric policies 222 is a set of one or more policies used to determine the geometric layout of the flow diagram. Geometric policies 222 may include one or more geometric policies. A geometric policy calculates a bid for each candidate page taking into consideration the geometry of the flow diagram. When page break manager 214 selects a candidate page and delegates the actual move of the inter-page node according to the geometric policy. In this example, the geometric policy calculates the new position of the inter-page node on the selected candidate page.

Figure 4:
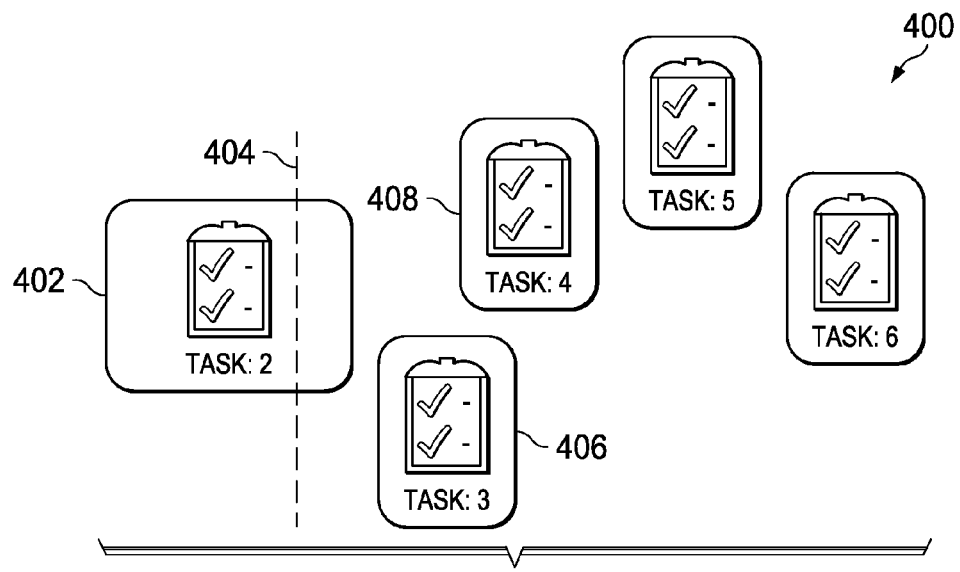
FIG. 4 is a block diagram of a portion of a flow diagram having an inter-page node in accordance with an illustrative embodiment.
Figure 5:
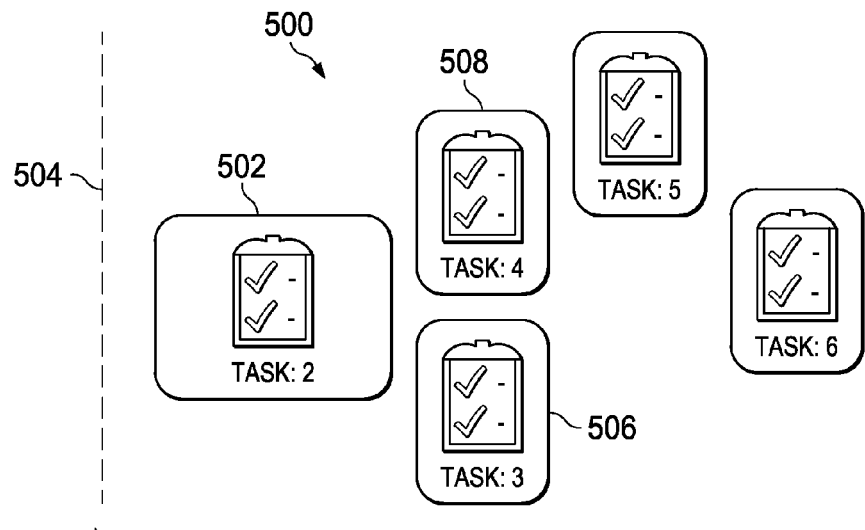
FIG. 5 is a block diagram of a portion of a process flow diagram after the nodes are automatically rearranged to eliminate an inter-page node in accordance with an illustrative embodiment.

Sweep policy 226 is a policy in geometric policies 222 that calculates a bid for each candidate page based on the number of nodes on a page that will be moved to make space for an inter-page node to be moved off a page-break. The fewer the number of nodes on a given page that need to be moved to make room for an inter-page node, the higher the bid that is submitted. Sweep policy 226 models every node in the flow diagram as an axis-parallel rectangle. Sweep policy 226 creates a sweep rectangle, as shown in FIGS. 4 and 5 below. The sweep rectangle is a model of the nodes in the flow diagram that is created by moving the inter-page node that is laid on a page break from its initial position to its new position on the selected candidate page. Sweep policy 226 sweeps and moves the inter-page node orthogonally. The inter-page node is moved in a sweep direction that is one of two possible orientations for either of the two axes, such as bottom, top, left, and/or right. Sweep policy 226 finds all nodes overlapping with other nodes in the sweep rectangle as a result of sweeping the inter-page node from its initial position laid out on the page break to the new position off the page break and on the selected candidate page. Sweep policy 226 moves the overlapping nodes in the specified sweep direction, as shown in FIG. 4 and FIG. 5 below.

In this embodiment, sweep policy 226 moves the inter-page node overlapping the page break to a new position on a selected candidate page off the page break to form the sweep rectangle. The sweep rectangle is a rectangle created by sweeping the bounding box of the inter-page node from its initial position to its new position after it has been moved off the page break. If there are not any nodes overlapping with the sweep rectangle, sweep policy 226 terminates.

If sweep policy 226 determines that there are any nodes on the candidate page that are overlapping with the sweep rectangle, sweep policy 226 sorts the overlapping nodes in an ascending order in the corresponding axis to the sweep direction. The corresponding axis is the x-axis for left and right sweep directions. The corresponding axis is the y-axis for top and bottom sweep directions. Sweep policy 226 computes a new position of each overlapping node in the sorted list. Sweep policy 226 then computes a new sweep rectangle representing the overlapping nodes in the new sorted position computed for the overlapping nodes and recurs.

In another embodiment, sweep policy 226 determines whether moving an inter-page node to the candidate page would require moving other nodes on the candidate page beyond the left or top border of the flow diagram. In this embodiment, if sweep policy 226 determines that moving the inter-page node to the candidate page would result in moving other nodes beyond the left or top border of the flow diagram, sweep policy 226 places a negative bid for that candidate page to minimize the chances that that candidate page will be selected. For example, a negative bid may be a hid of negative one (−1.0).

Semantic policies 224 are a set of one or more policies concerned with the semantics of a flow diagram. A semantic policy considers the semantics of the flow diagram. Semantics include the input connections flowing into a node and the output connections flowing out of the node. Each semantic policy calculates a bid for each candidate page based on those semantics. Empty page policy 228 is a semantic policy that calculates a bid for each candidate page based on whether the candidate page is empty or contains at least one node. Empty page policy 228 places its highest bid for pages that are not empty and the lowest bid for empty pages. An empty page is a page that does not contain any nodes on the page. In this manner, empty page policy 228 minimizes the chances that a node laid out on a page break will be moved onto an empty page and, thereby, limits the number of pages on which the flow diagram is printed. In one example, empty page policy 228 places a bid of one (1.0) for pages that contain at least one node and places a bid of zero (0.0) for pages that do not contain any nodes. In this embodiment, empty page policy 228 never places a negative bid value.

Connection policy 230 is a policy optionally included in the set of semantic policies 224. Connection policy 230 considers the input and output connections of a node in calculating a bid for each candidate page. The nodes connected to a start point or an end point of a connector is called the source and the target of the connection, respectively. The page on which the source point of the connection is placed is called the source page. The page on which the target point of the connection is located is called the target page of the connection. The distance for a connection is the target page number minus the source page number. For example, the connection distance for a connection with a start point on page 32 and an end point of the connection on page 53 is calculated as follows:

$$53-32=21$$

Thus, the connection distance in this example is 21. The connection distance may be a positive number or a negative number.

Connection policy 230 then calculates node dispersion for the candidate page. The node dispersion is the algebraic sum of positive connection distances for all input and output connections of a node and weighted absolute values of negative connection distances for all input and output connections of the node. The weight for the negative connection distances is a predetermined positive number. For example, a node may have three connections that are flowing into the node or flowing out of the node. If the connection distances for these three connections are 21, 3, and −10, and the weight for the negative connection distances is 3 then the node dispersion would be $(21+3)+(3*|-10|)=54$. In another example, if the connection distances are 18, −8, and −13, and weight for the negative connection distances is 2 then the node dispersion would be $(18)+(2*|-8|+2*|-13|)=60$.

Connection policy 230 places a bid indicating highest interest for the candidate page that would result in the lowest dispersion value for the node. In this example, but without limitation, a high bid indicates a high interest in selecting the candidate page. Therefore, a high bid is placed for a candidate page with the lowest node dispersion. Connection policy 230 places a bid that indicates a low interest in selecting the candidate page that results in the highest dispersion value for the node that is being moved. In this example and without limitation, a low bid indicates a low interest. Therefore, connection policy 230 submits a low bid for the candidate page with the highest dispersion value.

For each given inter-page node, each policy in set of policies 220 places a bid for each page in the set of candidate pages to which the given inter-page node could be moved. Candidate page selection 216 then gathers all bids. In one embodiment, bidding process 218 normalizes each bid that is received from a page break policy so that the value of each bid is a value between zero (0.0) to one (1.0) or a value of negative one (−1.0). The negative value indicates that the page break policy that submitted the bid for a given candidate page does not recommend moving the inter-page node to that given candidate page. A bid value between zero (0.0) and one (1:0) indicates that the page break policy that submitted the bid has an interest in moving the inter-page node to that candidate page. In this example, the higher the bid value for a given candidate page, the greater the policy's interest in the given candidate page being selected.

In another embodiment, candidate page selection 216 normalizes the bids received from one or more page break policies by multiplying the bids placed by each page break policy by a predetermined weight associated with the policy. Candidate page selection 216 then creates one aggregate bid for each candidate page in the set of candidate pages by computing the algebraic sum of all the bids for that candidate page.

Candidate page selection 216 selects the best candidate page based on the bids. In this example, candidate page selection 216 selects the candidate page with the highest aggregate bid. However, the embodiments are not limited to using a predetermined weight and aggregating bids or using bid values that are normalized to bids between negative one (−1.0) and one (1.0). The embodiments may be implemented using bid values within any range of values and any technique for normalizing bids. In addition, rather than using higher bid values to indicate a preferred candidate page, the embodiments may use the lowest values to indicate preferred candidate pages. In other words, any system of bidding may be used to select candidate pages in accordance with the embodiments.

Once the candidate page for the given inter-page node is selected, page break manager 214 delegates the calculations for moving the inter-page node into the selected candidate page to the geometric policy in geometric policies 222 with the highest bid for that selected candidate page. Page break manager 214 iterates through the page break policies that submitted bids and finds the geometric policy with the highest bid for the selected candidate page. The selected geometric policy may not be the geometric policy that placed the highest bid for the selected candidate page. When a candidate page and a geometric policy are selected, the selected geometric policy moves the inter-page node off the page break and onto the selected candidate page. Page break manager 214 repeats this process iteratively until there are not nodes laid out on a page break in the flow diagram.

In one embodiment, a node that is not located on a page break and does not fit in a single page will only be moved if it is necessary to free space for an inter-page node to be moved. If it is necessary, page break manager 214 will move other nodes that are not laid out on a page break in order to make space to move a given inter-page node off a page break. However, page break manager 214 does not move a node if moving the node will result in two nodes overlapping each other.

In another embodiment, page break manager 214 also preserves the locality in space of connected nodes. In other words, page break manager 214 avoids moving nodes that are directly connected to each other onto pages that are far from each other in the bundled printout. For report format flow diagrams, page break manager 214 also avoids or minimizes the number of connections that reference back to previous pages. In other words, page break manager 214 attempts to keep all connections referencing forward so that a reader does not have to turn back to previous pages to follow the flow diagram.

In one embodiment, page break manager 214 only uses empty page policy 228 and sweep policy 226 for flow diagrams in poster format. In report layout, page break manager 214 uses empty page policy 228, sweep policy 226, and connection policy 230 to select a candidate page.

In another embodiment, if an inter-page node is a nested node, page break manager 214 attempts to move the inter-page node and its entire containment of nested node(s) off the page break. However, if that is not possible due to the size of the inter-page node, page break manager 214 recursively steps into the nested inter-page node and moves all the nested inter-page nodes off the page break, one nested node at a time.

In this embodiment, not every bounding box represents necessary containment. In other words, a component that is illustrated as being nested within another component may be implemented as a separate component rather than a nested component. For example, in this embodiment, candidate page selection 216 is illustrated as being included within page break manager 214. In another embodiment, candidate page selection 216 may be implemented as a separate component from page break manager 214. Likewise, in this example, print layout 204 is shown as a separate component from page break manager 214, however, in another example, page break manager 214 may be implemented as a component that is included within page break manager 214. Thus, the embodiments are not limited to implementing the components shown in FIG. 2 with the components nested in the same configuration as is shown in FIG. 2.

Figure 3:
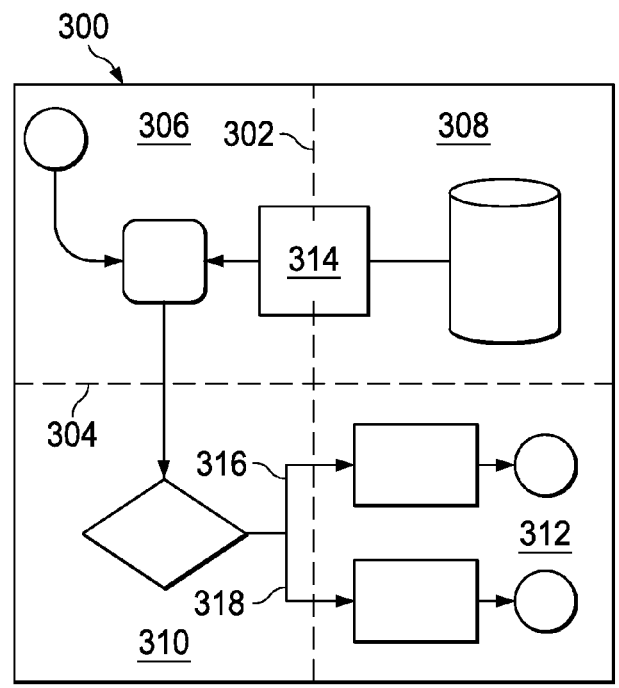
FIG. 3 is a block diagram of a virtual process flow diagram modeled in a business process modeler in accordance with an illustrative embodiment.

Referring now to FIG. 3, a block diagram of a virtual process flow diagram modeled in a business process modeler is shown in accordance with an illustrative embodiment. Flow diagram 300 is an example of one possible flow diagram that may be generated by a process editor, such as process editor 202 in FIG. 2. However, the embodiments are not limited to implementation on the flow diagram shown in FIG. 3. The embodiments may be implemented using a flow diagram having any number of nodes and connections laid out in any order and/or configuration.

In this example, but without limitation, flow diagram 300 is a flowchart generated by a generic process editor. Flow diagram 300 represents a process. A process may be a method, set of transformations, an algorithm, a system, or any procedure that may be depicted in a series of one or more steps.

Flow diagram 300 includes page breaks 302 and 304 dividing flow diagram 300 into a grid. Page breaks 302 and 304 are lines dividing flow diagram 300 into multiple pages, such as pages 306, 308, 310, and 312. The embodiments recognize that using current methods to print flow diagrams into paginated printouts the user may find it difficult to track which printed page corresponds to which location in the grid when assembling the pages into a poster. The embodiments recognize that the flow of data and execution across different pages may be obscured where the user intends to present the printed pages of the flowchart in a page-by-page report. Likewise, the page breaks may dissect nodes and/or connections to make it even more difficult for a reader to follow the flow of data and understand the information represented in the flow diagram. For example, in flow diagram 300, page break 302 divides node 314 and connections 316 and 318.

In this embodiment, a process editor, such as process editor 202 in FIG. 2, displays flow diagram 300 to a user as a grid of rows and columns with page breaks 302-304 so that the user can see how the process diagram printout would look when output as printed pages. When a flow diagram is printed, it is desirable that all inter-page nodes laid out on page breaks be moved so that they are not cut into separate pages. In one embodiment, the process editor includes a page break manager, such as page break manager 214 in FIG. 2, which automatically and transparently moves inter-page nodes off page breaks.

FIG. 4 is a block diagram of a portion of a flow diagram having an inter-page node in accordance with an illustrative embodiment. Flow diagram 400 is part of a diagram having inter-page node 402 laid out on page break 404. A page break manager, such as page break manager 214 in FIG. 2, identifies a set of candidate pages for inter-page node 402, obtains bids for each candidate page from a set of page break policies, and selects a page onto which inter-page node 402 will be moved based on the bids received. As shown here, if inter-page node 402 is moved onto the same page as nodes 406 and 408, one or more of those nodes may have to be repositioned or moved to make space available for inter-page node 402, as shown in FIG. 5 below.

FIG. 5 is a block diagram of a portion of a process flow diagram after the nodes are automatically rearranged to eliminate an inter-page node in accordance with an illustrative embodiment. Flow diagram 500 is a flow diagram, such as flow diagram 400 in FIG. 4. In this example, a page break manager has moved an inter-page node off of page break 504 to a new position to form node 502. Nodes 506 and 508 were also moved to make more space available for node 502 to be placed on the same page as nodes 506-508. The page break manager moves the nodes to eliminate inter-page nodes. In other words, the nodes are moved and rearranged so that no nodes are overlapping with any other nodes on the same page. In one embodiment, the node is moved in accordance with a sweep policy, such as sweep policy 226 in FIG. 2.

FIG. 6 is a block diagram of a split anchor pair in accordance with an illustrative embodiment. Node 602 and node 604 are nodes in a flow diagram. The flow diagram has been divided into two separate pages by page break 606 indicating where the page break will occur when the flow diagram is printed out on multiple pages. A connection splitting component, such as connection splitter 210 has created a split anchor pair for a connection that crosses page break 606. In other words, when an inter-page connection crosses a page break, the connection splitting component splits the inter-page connection and adds a split anchor to each end of the split connection. In this example, the connection splitting component creates a split anchor pair that includes split anchor 608 on page 3 and split anchor 610 on page 4. The connection splitting component assigns a unique identifier to the split anchor pair. The unique identifier may be any number, letter, symbol, or combination of numbers, letters, and/or symbols. In this non-limiting example, the unique identifier is the number "1". Each split anchor in the split anchor pair is annotated with the unique identifier. This unique identifier allows a user to easily identify the corresponding split anchors in a given split anchor pair by looking for split anchors having the same unique identifier. In this example, split anchor 608 and split anchor 610 include the unique identifier "1" identifying split anchors 608 and 610 as members of the same split anchor pair.

Each split anchor may optionally be annotated with a data icon and data name. The data icon and/or data name may optionally be hidden by the user. In this example, a data icon and data name 612 is associated with split anchor 610 and a data icon and data name 614 is associated with split anchor 608.

The user is able to view the splitting of inter-page connections that cross page breaks in the process editor as the user continues to edit the flow diagram using the process editor. The connection splitting component automatically splits connections and generates split anchor pairs as the flow diagram is created and modified by the user so that inter-page connections are always split.

Figure 7:
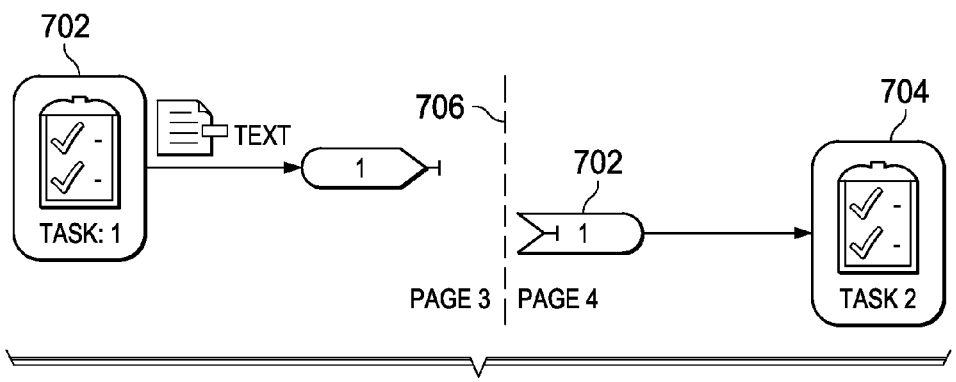
FIG. 7 is a block diagram of a split anchor pair with a hidden data icon and data name in accordance with an illustrative embodiment.

In the embodiment shown in FIG. 6, inter-page split anchor 610 is a split anchor that overlaps page break 606. In other words, inter-page split anchor 610 partially appears in the wrong page because there is not enough space for the split anchor to be located entirely on the correct page. In this case, part of the split anchor appears on the page before the page in which the adjoining node is located. However, a split anchor may also appear in whole or in part on an incorrect page because the split anchor appears on the page after the page in which the adjoining node is located. In such a case, the anchor splitting component hides data icon and data name 612 to increase the amount of space available on page 4 for the split anchor, as shown in FIG. 7 below. Once data icon and data name 612 is hidden or removed, inter-page split anchor 610 is moved closer to node 604 so that inter-page split anchor 610 no longer overlaps page break 606.

FIG. 7 is a block diagram of a split anchor pair with a hidden data icon and data name in accordance with an illustrative embodiment. In this example, spilt anchor 702 is a split anchor in a split anchor pair, such as the split anchor pair shown in FIG. 6. The data name and data icon associated with split anchor 702 is hidden to enable spit anchor 702 to be positioned between node 704 and page break 706 without overlapping either node 704 or page break 706.

Figure 8:
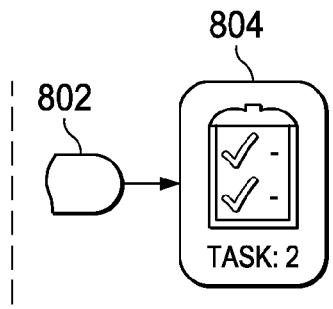
FIG. 8 is a block diagram of a cut portion of a split anchor in accordance with an illustrative embodiment.

FIG. 8 is a block diagram of a cut portion of a split anchor in accordance with an illustrative embodiment. In this example, there is not enough space on a given page for a complete split anchor. In such a case, the connection splitting component, such as connection splitting 210 in FIG. 2, may generate a cut portion split anchor rather than a full split anchor. Here, cut portion split anchor 802 is approximately half the size of a full split anchor. However, in accordance with the embodiment, a cut portion split anchor may be any size or shape that permits the split anchor to be placed between a page break and a node into which the connection terminates. The cut portion of the split anchor depends on the distance between the node and the page-break.

The reduced size of the cut portion split anchor permits a split anchor to be used with the split connection without allowing split anchor 802 to overlap with node 804, without split anchor 802 being cut-off by the page break, and without split anchor 802 being located on the wrong page. A split anchor may be located on the wrong page if it is wholly or partially located on a page other than the page on which that split anchor either begins or terminates. In this example, split anchor 802 is supposed to terminate at node 804. Therefore, the process prevents split anchor 802 from being located in whole or in part on a page other than the page on node 804 is located.

Figure 9:
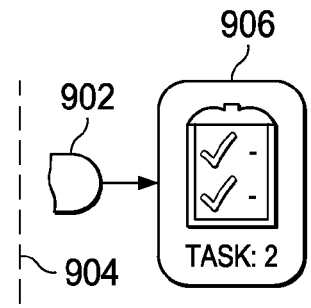
FIG. 9 is a block diagram of another cut portion of a split anchor in accordance with an illustrative embodiment.

FIG. 9 is a block diagram of another cut portion of a split anchor in accordance with an illustrative embodiment. In this example, there is not enough space on a given page for a complete split anchor. In such a case, the connection splitting component may generate a cut portion split anchor rather than a full split anchor. Here, cut portion split anchor 902 is approximately a quarter of the size of a full split anchor. However, in accordance with this embodiment, a cut portion split anchor may be any size or shape that permits the split anchor to be placed between page break 904 and node 906 into which the connection terminates. In this example, the cut portion split anchor does not include a unique identifier. However, in another embodiment, the cut portion split anchor may also include a unique identifier for the split anchor pair associated with the cut portion split anchor.

The cut portion of the split anchor gives the user a visual message that the node is too close to the page break. The user may then opt to move the split anchor further away from the page break so that the split anchor is fully visible rather than only a cut portion split anchor.

Figure 10:
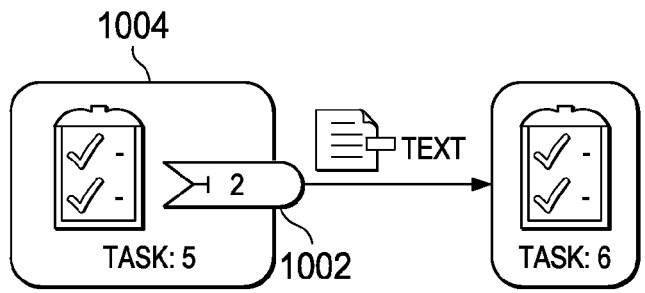
FIG. 10 is a block diagram of a split anchor overlapping a node in accordance with an illustrative embodiment.

FIG. 10 is a block diagram of a split anchor overlapping a node in accordance with an illustrative embodiment. In this example, split anchor 1002 is overlapping node 1004. The overlap may occur where split anchor 1002 is located too close to a page break or where there is not enough space between a node and a page break to accommodate split anchor 1002. In such a case, the connection splitting component places the split anchor above node 1004 or below node 1004, as shown in FIG. 11 below.

Figure 11:
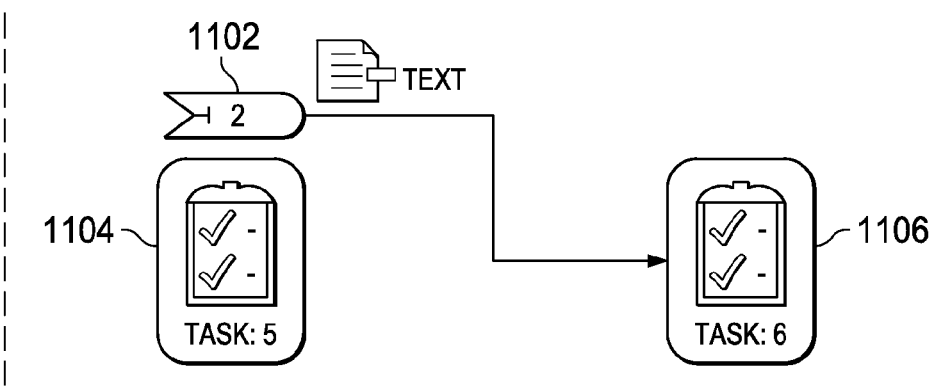
FIG. 11 is a block diagram of a split anchor relocated above a node in accordance with an illustrative embodiment.

FIG. 11 is a block diagram of a split anchor relocated above a node in accordance with an illustrative embodiment. Here, the connection splitting component has placed split anchor 1102 above node 1104 to avoid an overlap of split anchor 1102 with node 1104. In another embodiment, the connection splitting component places split anchor 1102 below node 1104 to prevent the overlap of split anchor 1102 and node 1104.

In yet another embodiment, if the connection splitting component determines that there is not enough space available to permit split anchor 1102 to be moved either above or below node 1104, then the connection splitting component may optionally hide or remove any data icons and/or data names associated with split anchor 1102 and then move split anchor 1102 closer to node 1106 to avoid the overlap. In still another embodiment, a user may opt to manually adjust the placement of split anchor 1102 to resolve the overlap.

Figure 12:
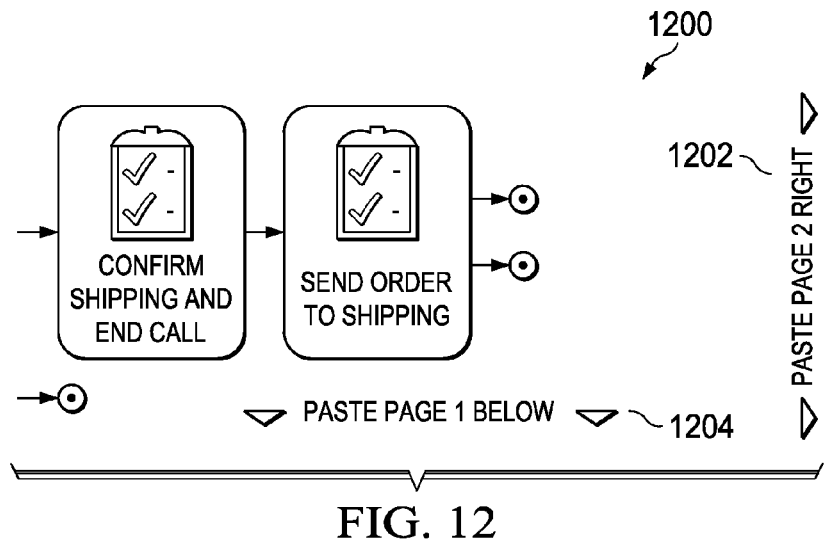
FIG. 12 is a block diagram of a poster format page in accordance with an illustrative embodiment.

FIG. 12 is a block diagram of a poster printout page in accordance with an illustrative embodiment. Page 1200 is one page of a multi-page flow diagram. Page 1200 is annotated around its right and bottom margins with navigational aid annotations 1202 and 1204 for recreating the flow diagram in a complete image of the flowchart in a poster format. In this example, navigational aid annotation 1202 indicates that page 1200 is pasted to page 2 along the right margin. Navigational aid 1204 on page 1200 indicates that page 1 is pasted or connected to page 1200 along the bottom margin to recreate the flow diagram in its entirety.

Figure 13:
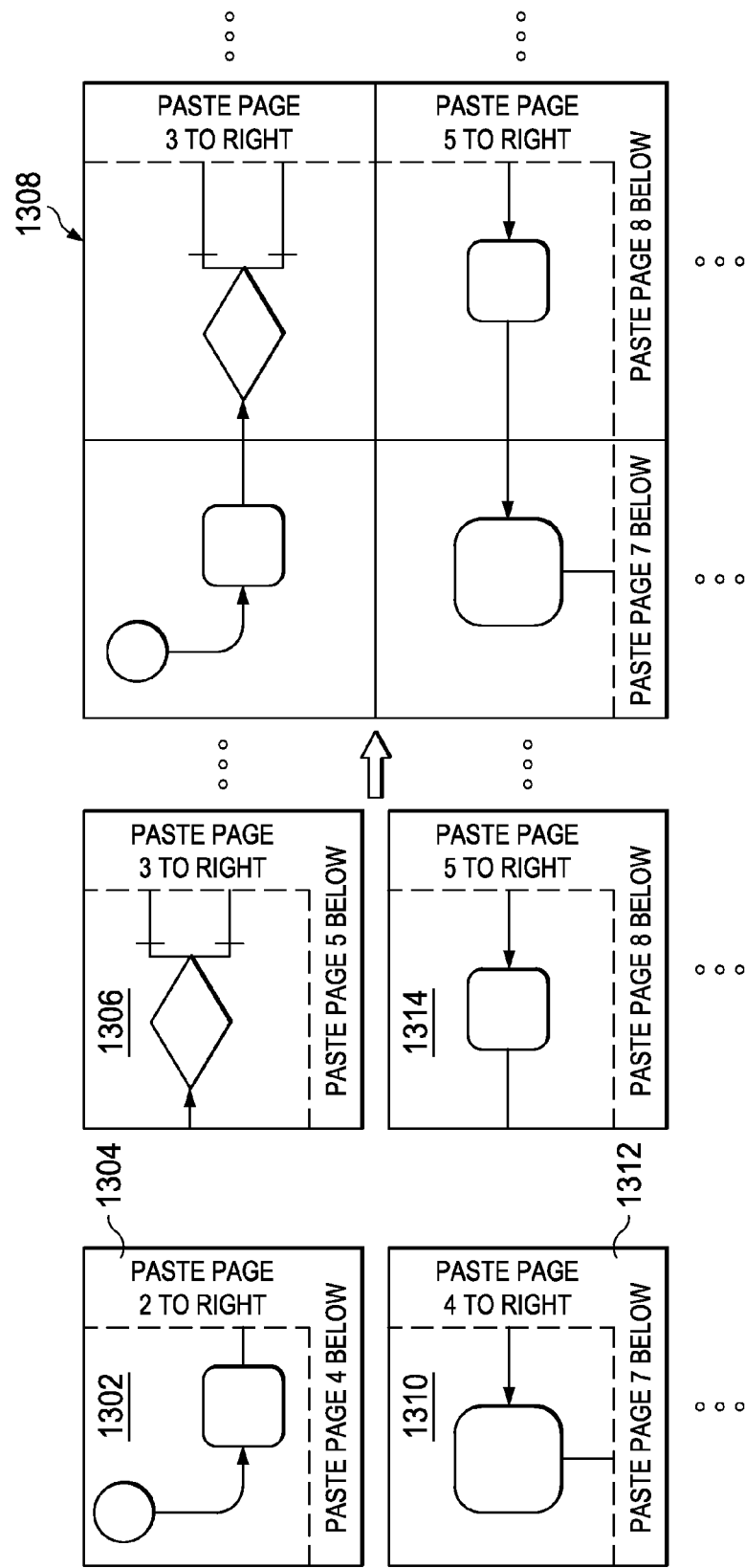
FIG. 13 is a block diagram of pages from a multi-page flow diagram in a poster format in accordance with an illustrative embodiment.

FIG. 13 is a block diagram of flow diagram printed pages in a poster format in accordance with an illustrative embodiment. In this embodiment, a navigational annotator, such as navigational annotator 212 in FIG. 2, adds navigational aids to the margins of each page in a poster format to facilitate reassembly of the complete flow diagram. The navigational aids consist of annotated instructions to the user regarding which pages should be placed adjacent to the current page in order to assemble the complete diagram.

For example, but without limitation, diagram portion 1302 represents page 1 of a multi-page flow diagram. Diagram portion 1302 includes navigational aid 1304 in a right margin indicating that page 1 should be connected to page 2 by a user to recreate the complete flow diagram. Likewise, diagram portion 1310 represents page 3 of the multi-page flow diagram and contains navigational aid 1312 in the right margin indicating that page 3 should be connected to page 4. Page 4 is represented by diagram portion 1314. Diagram portion 1314 may optionally include navigational aids indicating other pages to which page 4 should be connected. When the complete diagram is assembled from the printed pages, as shown in connected pages 1308, the navigational aid in the margin is covered by the overlapping edge of each adjacent page, such as, without limitation, connected pages 1308. The result is a seamless image of the original diagram.

Figure 14:
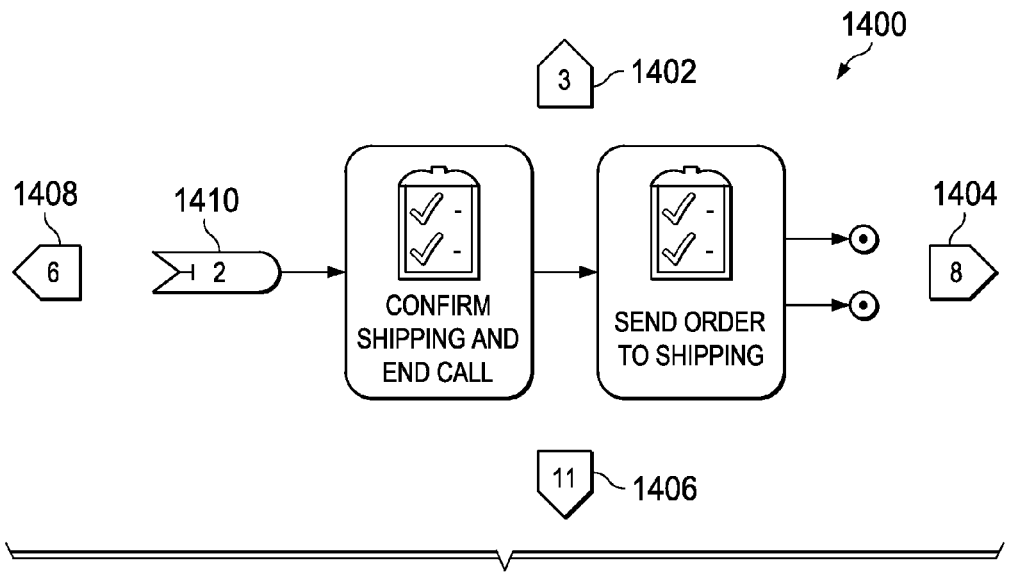
FIG. 14 is a block diagram of a report format page from a flow diagram in accordance with an illustrative embodiment.

FIG. 14 is a block diagram of a report format page in accordance with an illustrative embodiment. Page 1400 is one page of a multi-page flow diagram that is printed in a report format. The report format may be used when a user wants to bundle the diagram printout as part of a report or a book. In a report format, the flow diagram is not intended to be used to recreate the flow diagram in its entirety. Therefore, navigational aids are annotated around the margins of each page and each connection that crosses a page break is automatically split into a pair of source and target split anchors. The navigational aid annotations facilitate navigation between each page of the diagram. Page 1400 is annotated around its right, bottom, top, and left margins with navigational aid annotations 1402, 1404, 1406, and 1408 for recreating the flow diagram in a complete image of the flowchart in a poster format.

Navigational aid annotations 1402, 1404, 1406, and 1408 provide instructions directing the reader to the pages on which the flow diagram continues. In this example, the navigational aid annotations are provided in the form of directional arrows containing text that gives the number of adjacent pages in that direction. Here, page 1400 includes a navigational aid annotation in all four margins. However, a paginated report format flow diagram page may include any number of navigational aids. For example, page 1400 may include only one navigational aid annotation in a single margin, two navigational aid annotations in two margins, or three navigational aid annotations in three margins.

Split anchor 1410 is a split anchor in a split anchor pair. In this embodiment, each pair of split anchors is given a unique identifier. The identifier may be any number, letter, symbol, or series of number(s), letter(s), or symbol(s). In this example, but without limitation, split anchor 1410 has the unique number "2". The other split anchor in the split anchor pair is located on a different page. That split anchor also include the same unique identifier, such as, the number "2".

The connection splitting component, such as connection splitting 210 in FIG. 2, optionally annotates each split anchor with the page number of the split anchor's counterpart. This option is used when the diagram is prepared for printing. The annotation of split anchors with page numbers is performed automatically and transparently when the user prints a flow diagram. The page number annotations and the unique identifier on each split anchor allows the reader to quickly navigate to the opposite anchor in the split anchor pair and follow the data and execution flow of the flow diagram.

In other words, each split anchor optionally includes an annotation of the page number in which the other split anchor of the split anchor pair may be found. In this example, split anchor 1410 includes an annotation of the page number "p. 6" indicating that the corresponding split anchor in this split anchor pair can be found on page 6. A reader looking at the page shown in FIG. 14 can quickly determine that the corresponding anchor pair associated with split anchor 1410 is located on page 6. If the reader then turns to page 6, the reader can quickly locate the split anchor with the unique identifier "2" to identify the correct split anchor corresponding to split anchor 1410. Thus, navigational aid annotations 1402, 1404, 1406, and 1408 and split anchor 1410 with annotations enable a reader to follow the execution of the flow diagram in any direction by simply flipping to the desired page indicated by the annotations.

Figure 15:
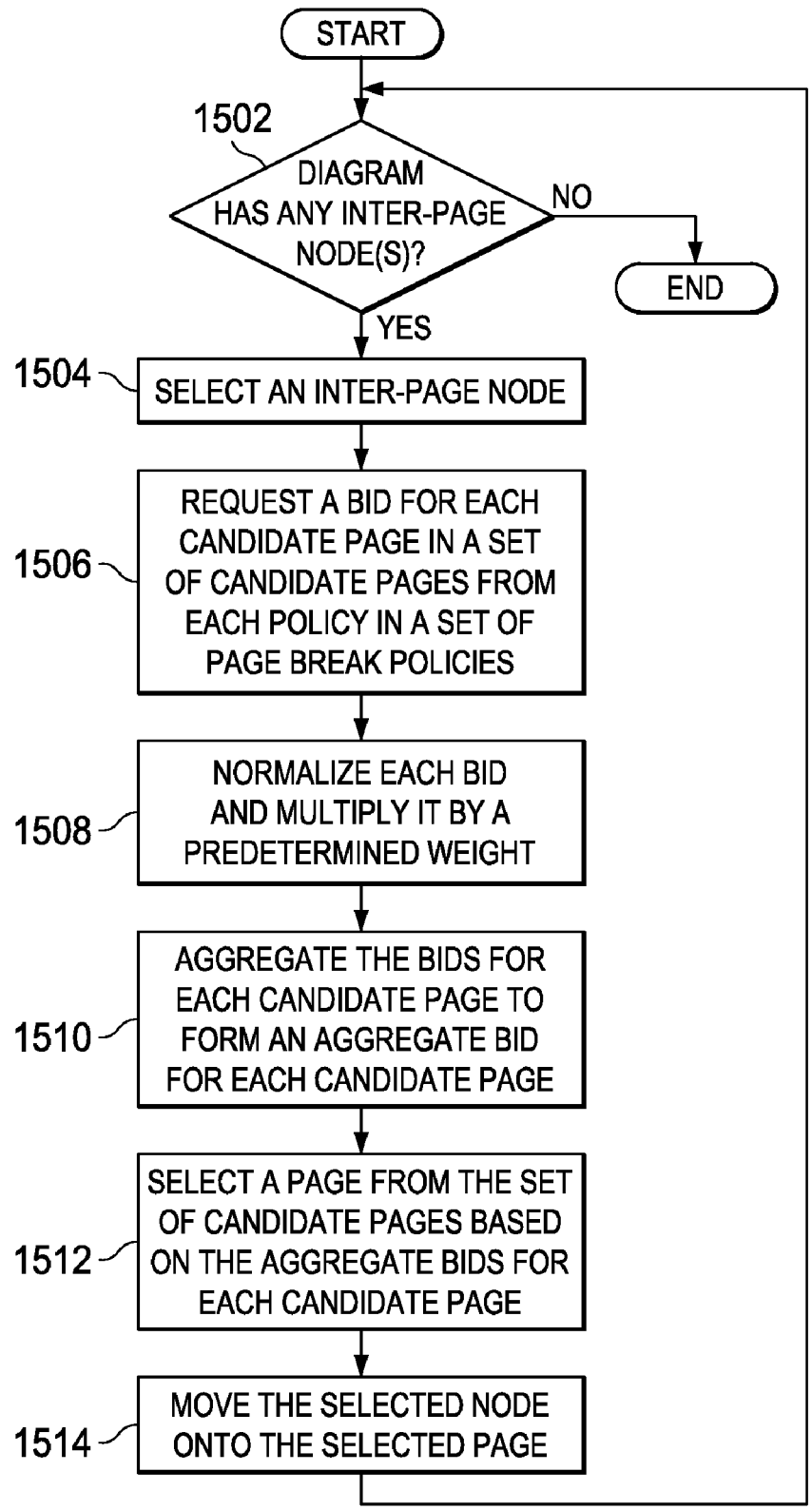
FIG. 15 is a flowchart of a process for eliminating inter-page nodes in accordance with an illustrative embodiment.

FIG. 15 is a flowchart of a process for eliminating inter-page nodes in accordance with an illustrative embodiment. The process in FIG. 15 may be implemented by software for moving nodes off of page breaks, such as page break manager 214 in FIG. 2.

The process begins by making a determination as to whether any node in a flow diagram is an inter-page node laid out on a page break (step 1502). If no inter-page nodes are identified in the flow diagram, the process terminates thereafter. If an inter-page node is identified at step 1502, an inter-page node is selected (step 1504). A bid for each candidate page in a set of candidate pages is requested from each policy in a set of page break policies (step 1506). Each bid is normalized and multiplied by a predetermined weight (step 1508). The bids for each candidate page are aggregated to form an aggregate bid for each candidate page (step 1510) in the set of candidate pages. A page is selected from the set of candidate pages based on the aggregate bids for each candidate page (step 1512). In one embodiment, the page with the highest aggregate bid is selected.

The selected node is moved onto the selected page (step 1514). In one embodiment, a geometric policy is selected to move the selected inter-page node to a new position on the selected page. In other words, the geometric policy that placed the highest bid for the selected page is identified and a request that the identified geometric policy move the inter-page node into the selected page is sent. The process then returns to step 1502 and determines whether any other inter-page nodes remain in the flow diagram. If any inter-page node remains, the process executes steps 1504-1514 iteratively until none of the nodes remain on any page break. When there are no longer any inter-page nodes at step 1502, the process terminates thereafter.

Figure 16:
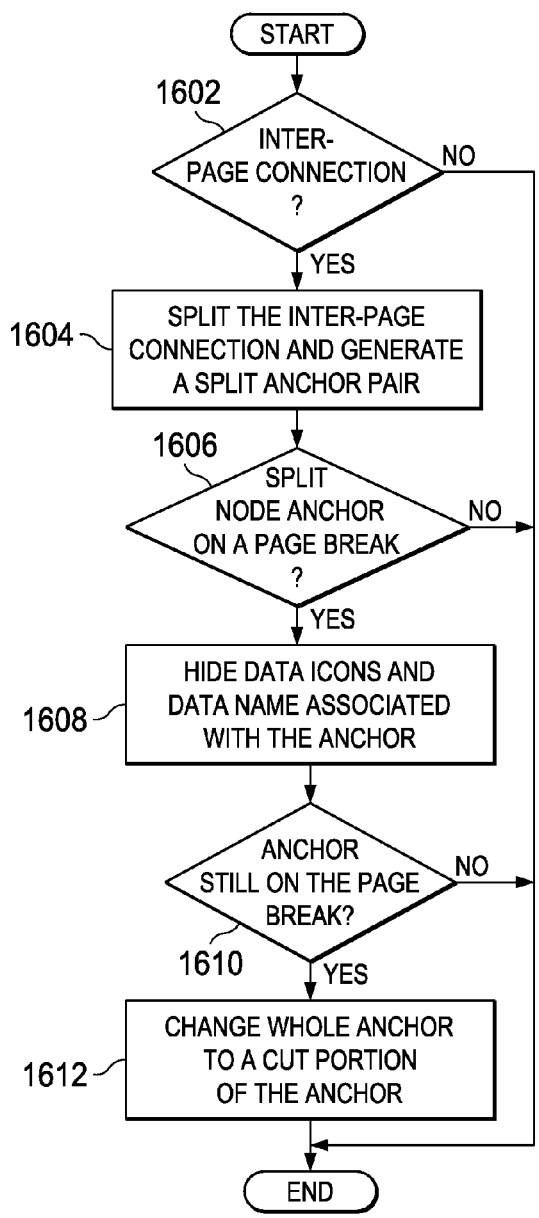
FIG. 16 is a flowchart of a process for eliminating inter-page connectors in accordance with an illustrative embodiment.

FIG. 16 is a flowchart of a process for eliminating inter-page connectors in accordance with an illustrative embodiment. The process in FIG. 16 may be implemented by a software component for splitting an inter-page connector, such as connection splitting 210 in FIG. 2.

The process begins by making a determination as to whether a connection is an inter-page connection (step 1602). If no, the process terminates thereafter. However, if at step 1602 the determination is made that the connection is an inter-page connection, the process splits the inter-page connection and generates a split anchor pair (step 1604). A determination is then made as to whether either of the generated split anchors in the split anchor pair is laid out on a page break (step 1606). If neither of the two split anchors is on a page break, the process terminates.

At step 1606, if a split anchor is on a page break, any data icon and/or data name associated with the split anchor located on the page break is hidden (step 1608). This frees up space to move the split anchor off the page break. A determination is then made as to whether the split anchor is still on the page break (step 1610). If the split anchor is no longer on the page break, the process terminates. If the split anchor is still on the page break because there is still not enough space available to move the split anchor off the page break, the split anchor is changed to a cut portion split anchor (step 1612) with the process terminating thereafter. In this manner, the process frees up sufficient space to move the split anchor off the page break. The cut portion split anchor may be any shape or size that permits the split anchor to be moved off the page break.

Figure 17:
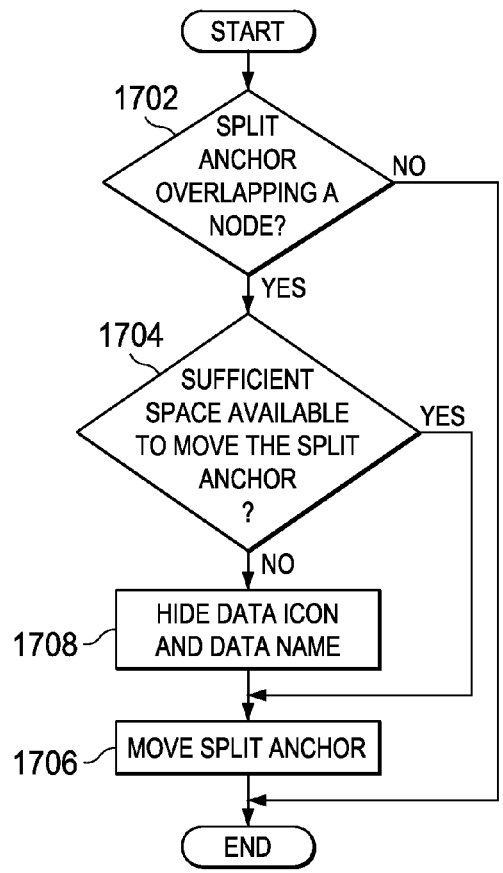
FIG. 17 is a flowchart of a process for moving a split anchor that overlaps a node in accordance with an illustrative embodiment.

FIG. 17 is a flowchart of a process for moving a split anchor that overlaps a node in accordance with an illustrative embodiment. The process in FIG. 17 may be implemented by a software component for resolving overlapping split anchors, such as connection splitting 210 in FIG. 2.

The process begins by making a determination as to whether a split anchor overlaps a node (step 1702). If no, the process terminates thereafter. If a split anchor overlaps a node, a determination is made as to whether sufficient space is available to move the split anchor (step 1704) to eliminate the overlap. If sufficient space is available, the split anchor is moved off of the node (step 1706) with the process terminating.

Returning to step 1704, if sufficient space is not available to move the split anchor off the node, the data icon and data name is hidden (step 1708) to free up more space. The split anchor is then moved off the node (step 1706) with the process terminating thereafter.

Figure 18:
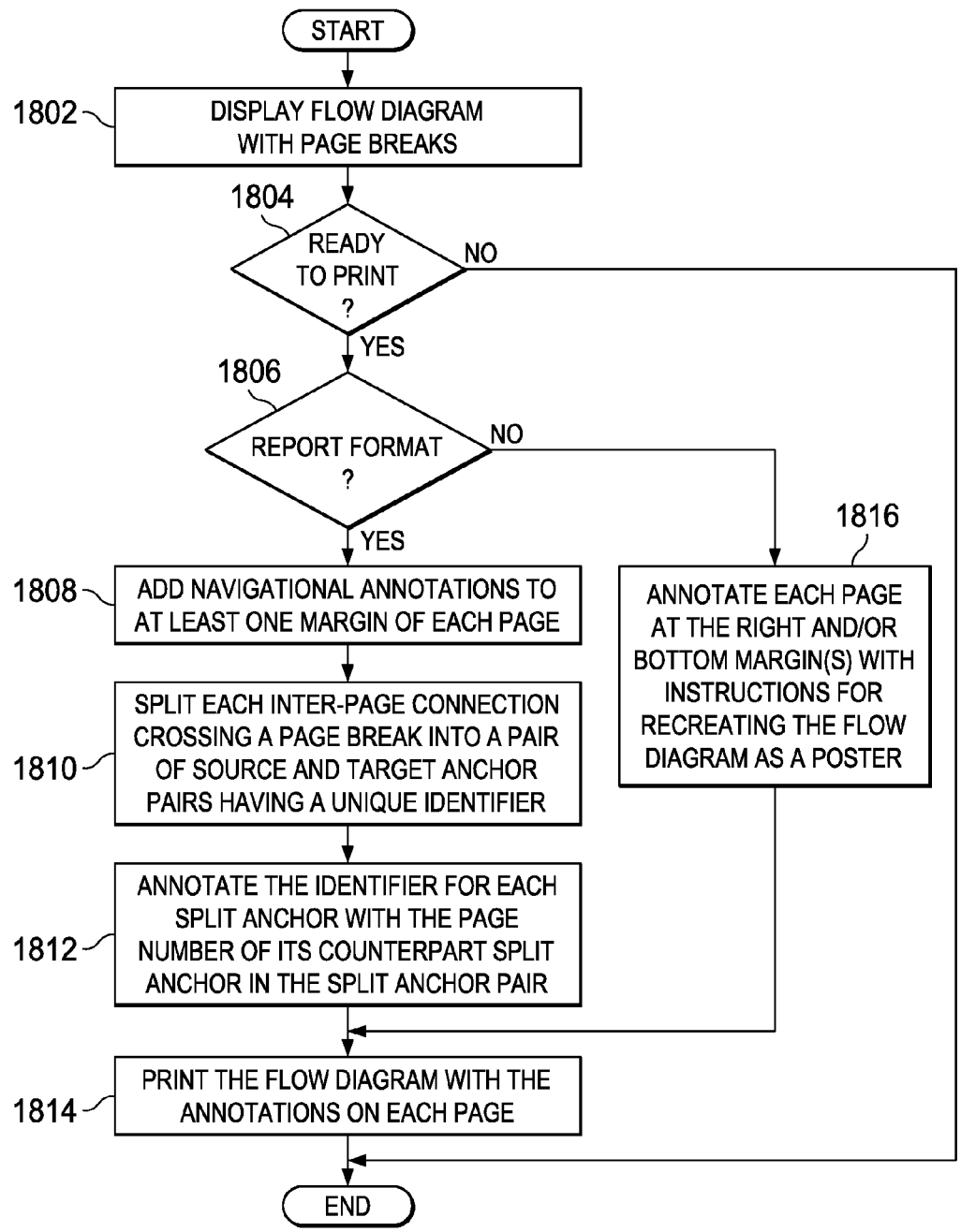
FIG. 18 is a flowchart of a process for generating navigational aids and annotations for paginated printouts of a flow diagram in accordance with an illustrative embodiment.

FIG. 18 is a flowchart of a process for generating navigational aids and annotations for paginated printouts of a flow diagram in accordance with an illustrative embodiment. The process in FIG. 18 may be implemented by software for generating navigational aids and annotations for flow diagrams, such as print layout 204 in FIG. 2.

The process begins by displaying the flow diagram with page breaks (step 1802). A determination is made as to whether the flow diagram is ready to print (step 1804). If the document is not ready to print, the process terminates. However, if the flow diagram is ready to print, a determination is made as to whether the flow diagram will be printed in a report format (1806). If the flow diagram will be printed in a report format, navigational annotations are added to at least one margin of each page (step 1808). Each connection crossing a page break is split into a pair of source and target anchor pairs having a unique identifier (step 1810). The identifier for each split anchor is annotated with the page number of its spit anchor counterpart in the split anchor pair (step 1812). The flow diagram is printed with the annotations on each page of the printout (step 1814) with the process terminating thereafter.

Returning to step 1806, if the flow diagram will not be printed in report format, each page of the flow diagram is annotated at the right and/or bottom margin(s) with instructions for recreating the flow diagram as a poster (step 1816). The flow diagram is printed with the annotations on each page of the printout (step 1814) with the process terminating thereafter.

The embodiments solve the problem of printing out paginated flow diagrams that branch out across multiple pages in two dimensions to produce printed output that is easy to understand and assemble into a complete image of the entire flow diagram. The embodiments provide a page break manager and connection splitting components that prevent nodes and connections from being laid out on page breaks. In addition, the page break manager is parameterized and extensible so that the behavior of the page break manager's algorithm can be adjusted through heuristic results and feedback from the user.

The embodiments also provide a navigational annotator that generates navigational aids and annotations to assist a user in reading and following a flow diagram across multiple pages. The poster format navigational aids and the report format navigational aids that are generated by the embodiments provide substantial improvements in usability and legibility of process flow diagram paginated printouts. For example, the embodiments generate split anchor pairs to replace inter-page connections. These split anchor pairs with annotations are beneficial in report format diagrams because the page-at-a-time presentation format of reports may be more difficult for a reader to understand and follow the flow of execution and data across multiple pages.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus, such as a communications fabric. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of resolving inter-page nodes in flow diagrams, the computer implemented method comprising:

responsive to identifying an inter-page node in a multiple page flow diagram, requesting a bid for each page in a set of candidate pages from each policy in a set of page break policies, wherein the inter-page node is a node laid out on a page break;

selecting a page from the set of candidate pages based on bids received from the set of page break policies to form a selected page, wherein a value of each bid indicates a level of suitability of each page in the set of candidate pages; and moving the inter-page node located on the page break to a new location on the selected page, wherein the new location on the selected page is located off or all page breaks for the flow diagram;

responsive to receiving a selection to print the flow diagram in a report format, splitting each connection in a set of connections crossing a page break to form a split connection and a split anchor pair associated with the split connection, wherein a first split anchor in the split anchor pair is generated on a first page where the split connection begins and a second split anchor in the split anchor pair is generated on a second page where the split connection ends, and wherein each split anchor pair is annotated with a unique identifier; and generating report format navigational aids in a set of margins on each page of the flow diagram, wherein the report format navigational aids comprises arrows and a page number identifying a subsequent page on which a next sequential portion of the flow diagram is found.

2. The computer implemented method of claim 1, wherein the set of page break policies comprises at least one geometric policy.

3. The computer implemented method of claim 2, wherein the geometric policy identifies the new location for the inter-page node on the selected page.

4. The computer implemented method of claim 1, wherein the set of page break policies comprises a connection policy and further comprising:

identifying a connection distance associated with each connection of the inter-page node for each page in the set of candidate pages, by the connection policy, wherein the connection distance indicates a distance between a target page and a source page.

5. The computer implemented method of claim 1 further comprising:

identifying a node dispersion value associated with the inter-page node for each page in the set of candidate pages, wherein the node dispersion value is computed from a set of connection distances for all input and output connections for the inter-page node; and generating a bid for each page in the set of candidate pages based on the node dispersion value for each page.

6. The computer implemented method of claim 1, wherein the set of page break policies comprises an empty page policy, and further comprising:

responsive to the empty page policy determining that the page contains at least one node, submitting a bid indicating a high suitability for the page; and responsive to the empty page policy determining that the page is an empty page, submitting a bid indicating a low suitability of the page, wherein an empty page does not contain any nodes on the page.

7. The computer implemented method of claim 1, wherein the inter-page node located on the page break is a first inter-page node in a set of nodes located on page breaks and further comprising:

identifying a next inter-page node in the set of nodes located on page breaks;

requesting a bid for each page in a next set of candidate pages from the set of page break policies;

selecting a page from the next set of candidate pages based on bids received from the set of page break policies to form a next selected page;

moving the next inter-page node to a location on the next selected page, wherein the location on the next selected page is located off of all page breaks for the flow diagram.

8. The computer implemented method of claim 1 further comprising:

responsive to receiving a selection to print the flow diagram in a poster format, generating poster format navigational aids in a set of margins on each page of the flow diagram, wherein the poster format navigational aids comprises annotations with instructions for recreating the flow diagram as a poster.

9. A non-transitory computer usable medium for resolving inter-page nodes in flow diagrams, the non-transitory computer usable medium comprising:

computer usable program code embodied on the non-transitory computer usable medium, the computer usable program code comprising:

computer usable program code configured to request a bid for each page in a set of candidate pages from each policy in a set of page break policies in response to identifying an inter-page node in a flow diagram, wherein the inter-page node is a node laid out on a page break;

computer usable program code configured to select a page from the set of candidate pages based on bids received from the set of page break policies to form a selected page, wherein a value of each bid indicates a level of suitability of the each page in the set of candidate pages; and computer usable program code configured to move the inter-page node located on the page break to a new location on the selected page, wherein the new location on the selected page is located off of all page breaks for the flow diagram;

computer useable program code configured to receive a selection to print the flow diagram in a report format;

computer useable program code configured to split, in response to receiving a selection to print the flow diagram in a report format, each connection in a set of connections crossing a page break to form a split connection and a split anchor pair associated with the split connection, wherein a first split anchor in the split anchor pair is generated on a first page where the split connection begins and a second split anchor in the split anchor pair is generated on a second page where the split connection ends, and wherein each split anchor pair is annotated with a unique identifier; and computer usable program code configured to generate report format navigational aids in a set of margins on each page of the flow diagram, wherein the report format navigational aids comprises arrows and a page number identifying a subsequent page on which a next sequential portion of the flow diagram is found.

10. The non-transitory computer usable medium of claim 9, wherein the set of page break policies comprises at least one geometric policy.

11. The non-transitory computer usable medium of claim 10, wherein the geometric policy identifies the new location for the inter-page node on the selected page.

12. The non-transitory computer usable medium of claim 9 further comprising:

computer usable program code configured to identify a node dispersion value associated with the inter-page node for each page in the set of candidate pages, wherein the node dispersion value is computed from a set of connection distances for all input and output connections for the inter-page node; and computer usable program code configured to generate a bid for each page in the set of candidate pages based on the node dispersion value for each page.

13. The non-transitory computer usable medium of claim 9, wherein the set of page break policies comprises a connection policy and further comprising:

computer usable program code configured to identify a connection distance associated with each connection of the inter-page node for each page in the set of candidate pages, by the connection policy, wherein the connection distance indicates a distance between a target page and a source page.

14. The non-transitory computer usable medium of claim 9, wherein the set of page break policies comprises an empty page policy, and further comprising:

computer usable program code configured to submit a bid indicating a high suitability for the page in response to the empty page policy determining that the page contains at least one node; and computer usable program code configured to submit a bid indicating a low suitability of the page in response to the empty page policy determining that the page is an empty page, wherein an empty page does not contain any nodes on the page.

15. The non-transitory computer usable medium of claim 9, wherein the inter-page node located on the page break is a first inter-page node in a set of nodes located on page breaks and further comprising:

computer usable program code configured to identify a next inter-page node in the set of nodes located on page breaks;

computer usable program code configured to request a bid for each page in a next set of candidate pages from the set of page break policies;

computer usable program code configured to select a page from the next set of candidate pages based on bids received from the set of page break policies to form a next selected page;

computer usable program code configured to move the next inter-page node to a location on the next selected page, wherein the location on the next selected page is located off of all page breaks for the flow diagram.

16. The non-transitory computer usable medium of claim 9 further comprising:

computer usable program code configured to generate poster format navigational aids in a set of margins on each page of the flow diagram in response to receiving a selection to print the flow diagram in a poster format, wherein the poster format navigational aids comprises annotations with instructions for recreating the flow diagram as a poster.

\* \* \* \* \*